United States Patent
Baker et al.

(10) Patent No.: US 7,612,312 B2
(45) Date of Patent: Nov. 3, 2009

(54) MOBILE HAND-HELD LASER WELDING SUPPORT SYSTEM

(75) Inventors: Martin C. Baker, Budd Lake, NJ (US); Clyde R. Taylor, Laurens, SC (US); William F. Hehmann, Greer, SC (US)

(73) Assignee: Honeywell International Inc., Morristown, NJ (US)

( * ) Notice: Subject to any disclaimer, the term of this patent is extended or adjusted under 35 U.S.C. 154(b) by 667 days.

(21) Appl. No.: 11/055,924

(22) Filed: Feb. 11, 2005

(65) Prior Publication Data
US 2009/0139967 A1 Jun. 4, 2009

(51) Int. Cl.
B23K 26/00 (2006.01)
B23K 26/12 (2006.01)

(52) U.S. Cl. .............................. 219/121.63; 219/121.86
(58) Field of Classification Search ................................. 219/121.63–121.72, 121.86
See application file for complete search history.

(56) References Cited

U.S. PATENT DOCUMENTS

| | | | | |
|---|---|---|---|---|
| 3,621,177 A | * | 11/1971 | McPherson et al. | 219/51 |
| 3,775,586 A | * | 11/1973 | Flint et al. | 219/121.63 |
| 3,806,829 A | * | 4/1974 | Duston et al. | 372/38.01 |
| 3,907,389 A | * | 9/1975 | Cox et al. | 312/1 |
| 4,564,736 A | * | 1/1986 | Jones et al. | 219/121.6 |
| 4,626,291 A | * | 12/1986 | Natale | 134/21 |
| 4,686,711 A | * | 8/1987 | Budmiger | 2/8.3 |
| 4,783,129 A | * | 11/1988 | Jacobson | 312/1 |
| 4,859,075 A | * | 8/1989 | Sutter et al. | 374/2 |
| 4,873,419 A | * | 10/1989 | Acheson | 219/125.1 |
| 4,942,281 A | | 7/1990 | Srba | |
| 4,970,367 A | | 11/1990 | Miller | |
| 5,065,448 A | * | 11/1991 | Ortiz, Jr. | 385/53 |
| 5,121,788 A | * | 6/1992 | Carollo | 165/47 |
| 5,193,897 A | * | 3/1993 | Halsey | 362/118 |
| 5,206,496 A | * | 4/1993 | Clement et al. | 250/271 |
| 5,401,171 A | * | 3/1995 | Paghdiwala | 433/215 |
| 5,536,077 A | * | 7/1996 | Ross | 312/1 |
| 5,653,900 A | * | 8/1997 | Clement et al. | 219/121.68 |
| 5,663,977 A | | 9/1997 | Fujimoto et al. | |

(Continued)

FOREIGN PATENT DOCUMENTS

JP 403281067 A * 12/1991

OTHER PUBLICATIONS

International Search Report PCT/US2006/003188 dated Aug. 22, 2007.

*Primary Examiner*—Samuel M Heinrich
(74) *Attorney, Agent, or Firm*—Ingrassia Fisher & Lorenz, P.C.

(57) ABSTRACT

A mobile support system for a hand-held laser welding wand includes a movable cart, a laser source, a fluid source, and a filler medium supply source. The laser source is mounted on the movable cart and is configured to supply laser light for the hand-held laser welding wand. The fluid source is mounted on the movable cart and is configured to supply cooling fluid for the hand-held laser welding wand. The filler medium supply source is mounted on the movable cart and is configured to supply a filler medium for use by the hand-held laser welding wand. The mobile support system is transportable to areas remote from a work shop environment, and provides stand-alone support for the hand-held laser welding wand.

9 Claims, 5 Drawing Sheets

U.S. PATENT DOCUMENTS

| | | |
|---|---|---|
| RE35,981 E | 12/1998 | Nagy et al. |
| 5,863,505 A * | 1/1999 | Wada et al. ................... 422/83 |
| 5,895,845 A * | 4/1999 | Burger ........................ 73/146 |
| 6,008,466 A | 12/1999 | Hosoda |
| 6,130,404 A * | 10/2000 | Campagna et al. ..... 219/121.69 |
| 6,168,676 B1 * | 1/2001 | Seguin ....................... 148/525 |
| 6,241,328 B1 * | 6/2001 | Ziff .............................. 312/1 |
| 6,288,362 B1 * | 9/2001 | Thomas et al. ......... 219/121.84 |
| 6,362,451 B1 * | 3/2002 | Karni et al. ............ 219/121.68 |
| 6,593,540 B1 | 7/2003 | Baker et al. |
| 6,621,039 B2 | 9/2003 | Wang et al. |
| 6,849,828 B2 | 2/2005 | Aigner |
| 6,851,769 B2 * | 2/2005 | Hauville ........................ 312/1 |
| 2005/0035198 A1 * | 2/2005 | Wilensky .................... 235/383 |

* cited by examiner

MOBILE HAND-HELD LASER WELDING SUPPORT SYSTEM

TECHNICAL FIELD

The present invention relates laser welding and, more particularly, to a mobile hand-held laser welding system.

BACKGROUND

Many components in a jet engine are designed and manufactured to withstand relatively high temperatures. Included among these components are the turbine blades, vanes, and nozzles that make up the turbine engine section of the jet engine. In many instances, various types of welding processes are used during the manufacture of the components, and to repair the components following a period of usage. In addition, other non-aerospace applications such as, for example, industrial and commercial tooling and die maintenance may also benefit from the laser welding repair process. Moreover, various types of welding technologies and techniques may be used to implement these various welding processes. However, one particular type of welding technology that has found increased usage in recent years is laser welding technology.

Laser welding technology uses a high power laser to manufacture parts, components, subassemblies, and assemblies, and to repair or dimensionally restore worn or damaged parts, components, subassemblies, and assemblies. In general, when a laser welding process is employed, laser light of sufficient intensity to form a melt pool is directed onto the surface of a metal work piece, while a filler material, such as powder, wire, or rod, is introduced into the melt pool. Until recently, such laser welding processes have been implemented using automated laser welding machines. These machines are relatively large, and are configured to run along one or more preprogrammed paths.

Although programmable laser welding machines, such as that described above, are generally reliable, these machines do suffer certain drawbacks. For example, a user may not be able to manipulate the laser light or work piece, as may be needed, during the welding process. This can be problematic for weld processes that involve the repair or manufacture of parts having extensive curvature and/or irregular or random distributed defect areas. Thus, in order to repair or manufacture parts of this type, the Assignee of the present application developed a portable, hand-held laser welding wand. Among other things, this hand-held laser welding wand allows independent and manual manipulation of the laser light, the filler material, and/or the work piece during the welding process. An exemplary embodiment of the hand-held laser welding wand is disclosed in U.S. Pat. No. 6,593,540, which is entitled "Hand Held Powder-Fed Laser Fusion Welding Torch," and the entirety of which is hereby incorporated by reference.

The hand-held laser welding wand, such as the one described above, provides the capability to perform manual 3-D adaptive laser welding on components. During use, the wand may be coupled to various support subsystems. For example, the wand may receive laser light, cooling fluid, filler media, and, in some instances, inert gas, from appropriate support subsystems. One or more of these subsystems may be installed in a work shop and not conveniently transportable. In some instances, welding operations using the hand-held laser welding wand may need to be performed in areas remote from a work shop environment. If one or more of the support subsystems are non-transportable, it may prohibit connecting the hand-held laser welding wand to the support subsystems, and potentially prevent its use.

Hence, there is a need for a support system for the hand-held laser welding wand that is fully transportable to areas remote from a work shop environment, so that the hand-held laser welding wand may be used at a remote work location. The present invention addresses at least this need.

BRIEF SUMMARY

The present invention provides a support system for the hand-held laser welding wand that is fully transportable to areas remote from a work shop environment.

In one embodiment, and by way of example only, a mobile support system for a hand-held laser welding wand includes a movable cart, a laser source, a fluid source, and a filler medium supply source. The laser source is mounted on the movable cart and is configured to supply laser light for the hand-held laser welding wand. The fluid source is mounted on the movable cart and is configured to supply cooling fluid for the hand-held laser welding wand. The filler medium supply source is mounted on the movable cart and is configured to supply a filler medium for use by the hand-held laser welding wand.

In another exemplary embodiment, a mobile laser welding system includes a movable cart, a laser source, a fluid source, a filler medium supply source, and a laser welding wand. The laser source is mounted on the movable cart and is configured to supply laser light. The fluid source is mounted on the movable cart and is configured to supply cooling fluid. The filler medium supply source is mounted on the movable cart and is configured to supply a filler medium. The laser welding wand is configured to be grasped by hand, and is coupled to receive the laser light from the laser source, the cooling fluid from the fluid source, and the filler medium from the filler medium supply source.

Other independent features and advantages of the preferred mobile support system will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
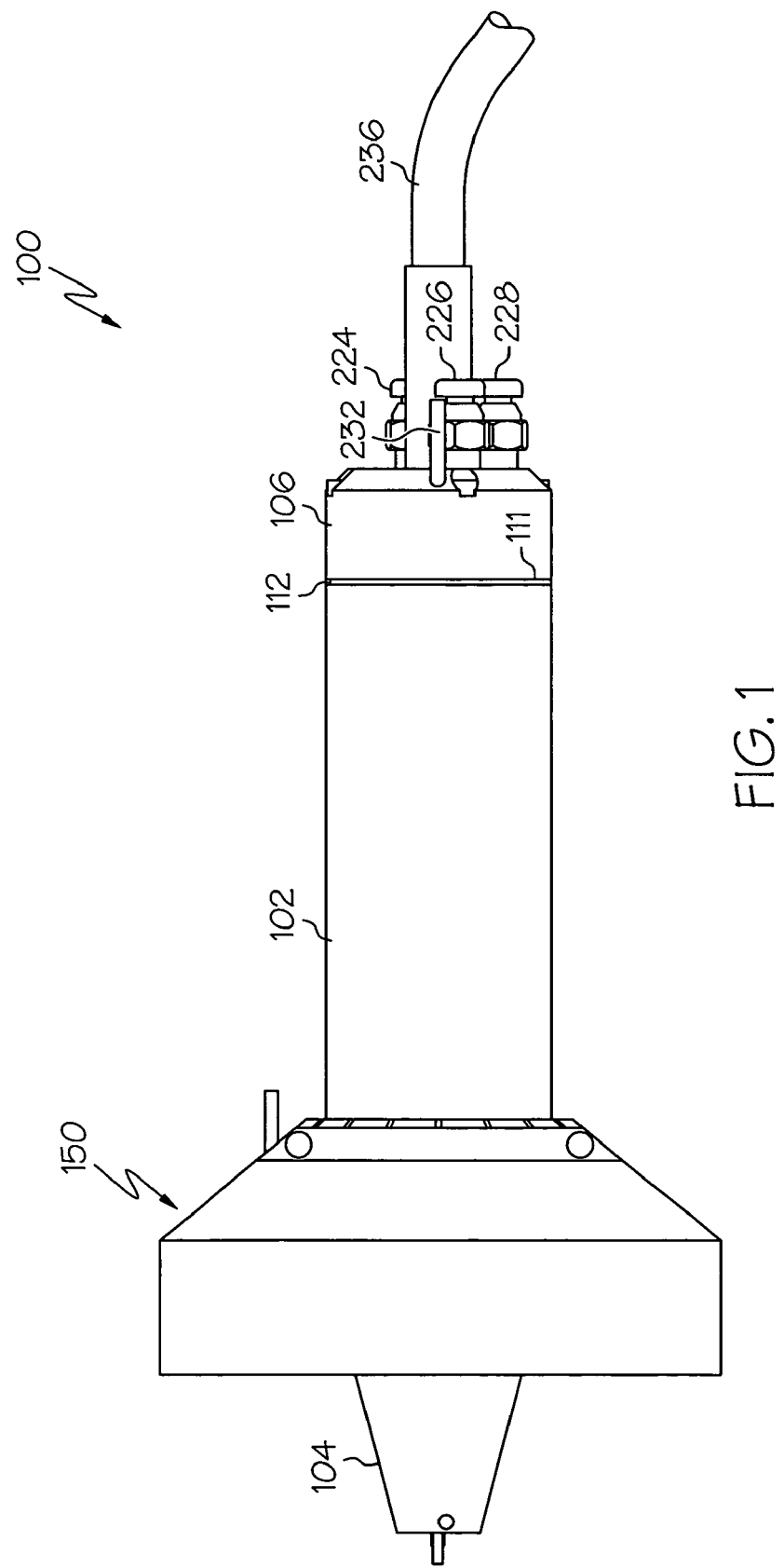
FIG. 1 is a side view of an exemplary hand-held laser welding wand.
Figure 2:
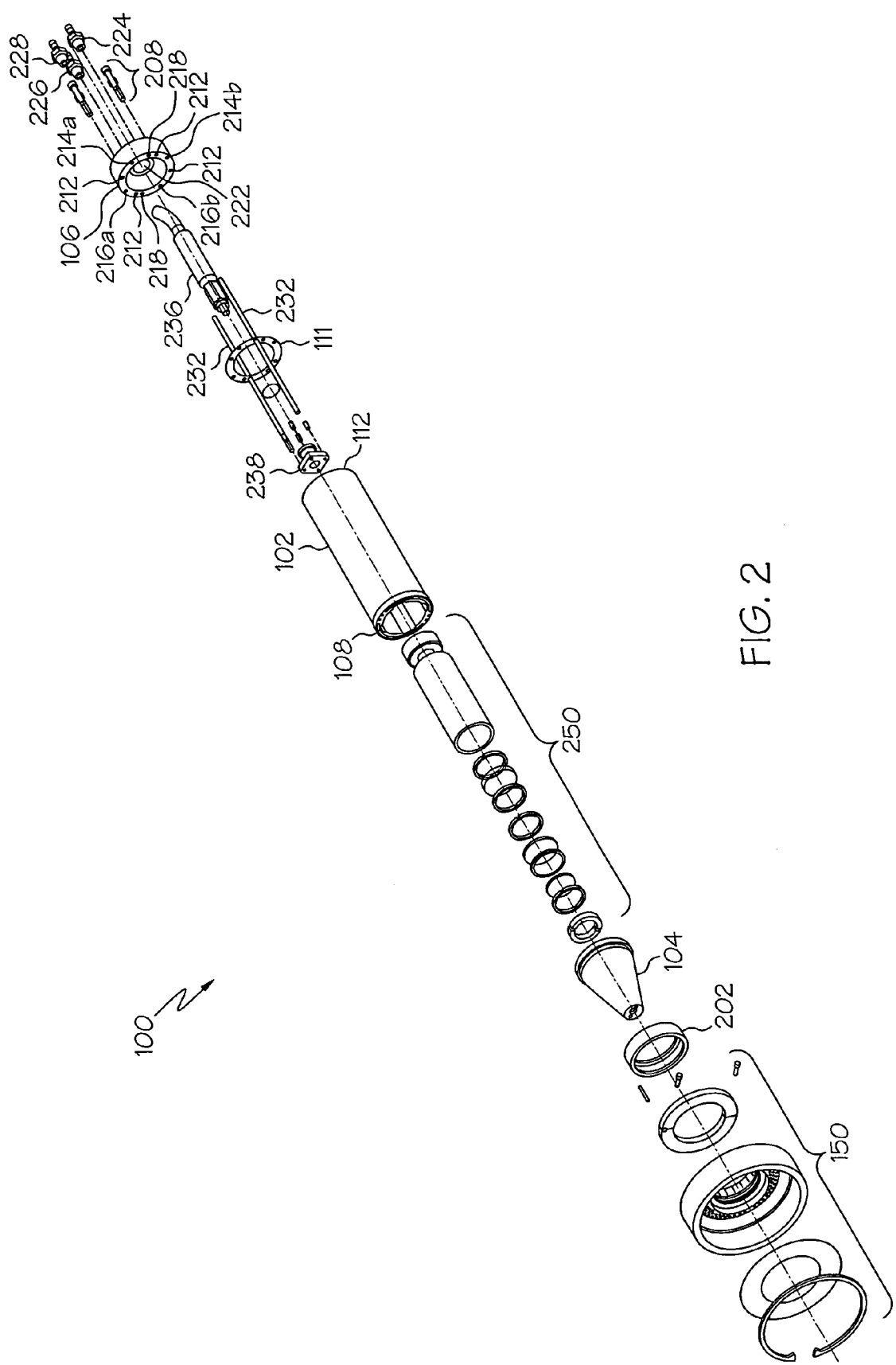
FIG. 2 is a perspective exploded view of the hand-held laser welding wand of FIG. 1.
Figure 3:
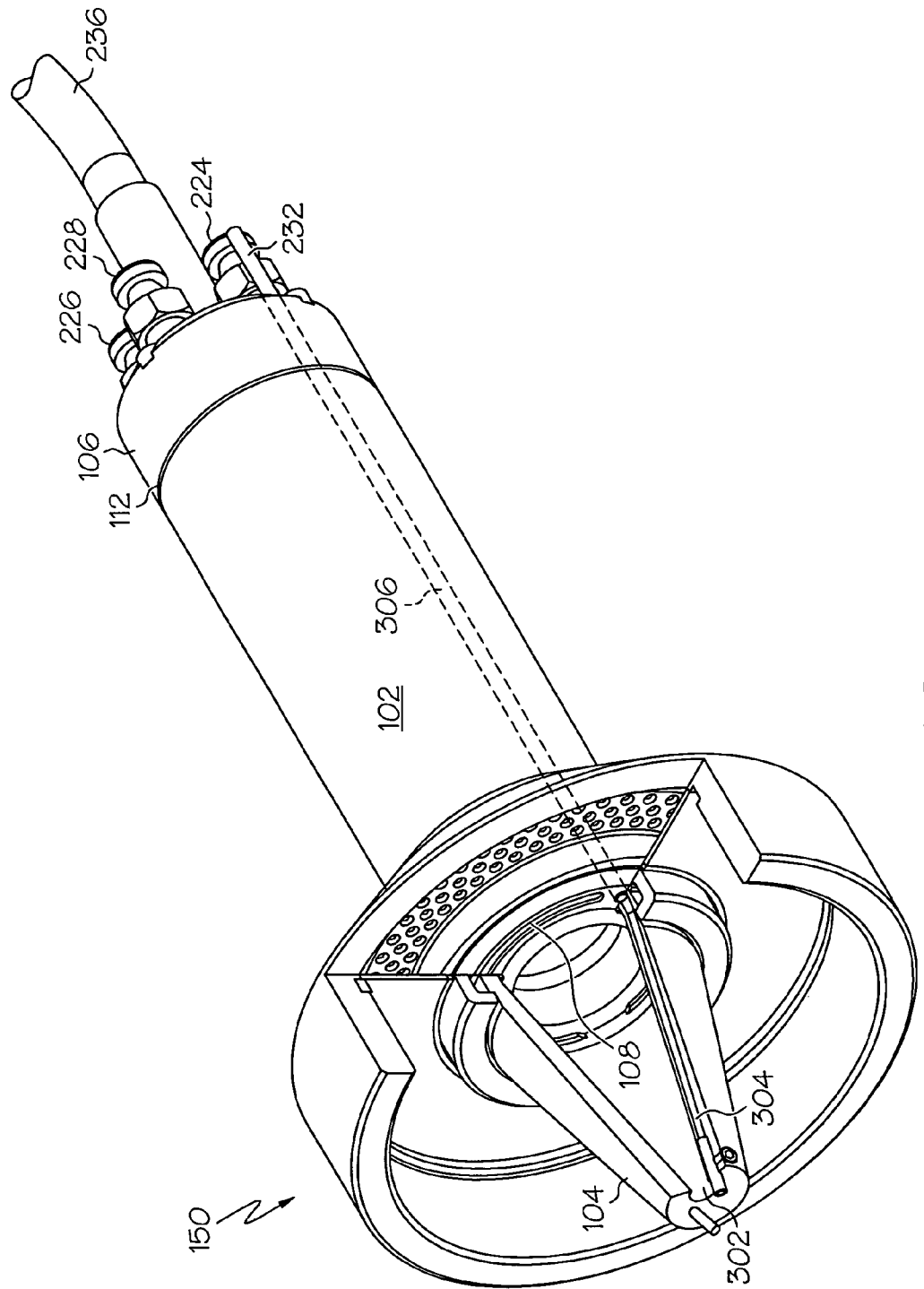
FIG. 3 is a partial cut-away perspective views of the hand-held laser welding wand shown in FIGS. 1 and 2.

Turning now to the description, and with reference first to FIGS. 1-3, an exemplary hand-held laser welding wand 100 is shown, and includes a main body 102, a nozzle 104, and an end cap 106. The main body 102, which is preferably configured as a hollow tube, includes a first end 108 (see FIG. 2), a second end 112, and a plurality of orifices and flow passages that extend between the main body first and second ends 108, 112. The orifices and flow passages are used to direct various fluids and other media through the main body 102. Included among these media are coolant, such as water, inert gas, such as Argon, and filler materials, such as powder, wire, or liquid. These orifices and flow passages are in fluid communication with orifices and flow passages in the nozzle 104, in the end cap 106, or both. A description of the specific configuration of each of the orifices and flow paths in the main body 102 is not needed. Thus, at least the coolant and gas orifices and flow passages in the main body 102 will not be further described. The main body filler media orifices and flow passages will be mentioned further below merely for completeness of description.

The nozzle 104 is coupled to the main body first end 108 via a threaded nozzle retainer ring 202. More specifically, in the depicted embodiment the main body 102 has a plurality of threads formed on its outer surface adjacent the main body first end 108. Similarly, the nozzle retainer ring 202 has a plurality of threads formed on its inner surface that mate with the main body threads. Thus, the nozzle 104 is coupled to the main body 102 by abutting the nozzle 104 against the main body first end 108, sliding the nozzle retainer ring 202 over the nozzle 104, and threading the nozzle retainer ring 202 onto the main body 102. It will be appreciated that the nozzle 104 could be coupled to the main body first end 108 in a different manner. For example, the nozzle 104 and main body 102 could be configured so that the nozzle 104 is threaded directly onto the main body first end 108.

With reference to FIG. 3, it is seen that the nozzle 104 includes an aperture 302 that extends through the nozzle 104. When the nozzle 104 is coupled to the main body 102, the nozzle aperture 302 is in fluid communication with the inside of the hollow main body 102. It is through this aperture 302 that laser light and gas pass during laser welding operations. The nozzle 104 additionally includes a plurality of filler media flow passages 304. The nozzle filler media flow passages 304 pass through the nozzle 104 and are in fluid communication with filler media delivery flow passages 306 that extend through the main body 102. The filler media delivery flow passages 304, 306 are used to deliver a filler media to a work piece (not shown).

The end cap 106 is coupled to the main body second end 112 via a gasket 111 and a plurality of end cap fasteners 208. In particular, the end cap fasteners 208 extend, one each, through a plurality of end cap fastener openings 212 (see FIG. 2) formed through the end cap 106, and into the main body second end 112. In addition to the end cap fastener openings 212, the end cap 106 also includes two coolant passages 214, 216, a gas supply passage (not shown), a plurality of filler media flow passages 218, and a cable opening 222. The two coolant passages include a coolant supply passage 214 and a coolant return passage 216. The coolant supply passage 214, which splits within the end cap 106 into two supply passages 214a, 214b, directs coolant, such as water, into appropriate coolant flow passages formed in the main body 102. The coolant return passage 216, which also splits within the end cap 106 into two return passages 216a, 216b, receives coolant returned from appropriate coolant flow passages formed in the main body 102. The non-illustrated gas supply passage directs gas into the main body 102.

The end cap filler media flow passages 218 are in fluid communication with the nozzle filler media flow passages 304 via the main body filler media flow passages 306. The end cap filler media passages 218 may be coupled to receive any one of numerous types of filler media including, but not limited to, powder filler and wire filler. The filler media may be fed into the end cap filler media flow passages 218 manually, or the filler media may be fed automatically from a filler media feed assembly (not shown). In the depicted embodiment, a plurality of filler media liner tubes 232 is provided. These filler media liner tubes 232 may be inserted, one each, through one of the end cap filler flow media passages 218, and into the main body filler media flow passages 306. The filler media liner tubes 232 further guide the filler media into and through the main body 102, and into the nozzle filler media flow passages 304. The filler media liner tubes 232 also protect the filler media flow passages against any erosion that could result from filler media flow through the flow passages. Although use of the filler media liner tubes 232 is preferred, it will be appreciated that the wand 100 could be used without the filler media liner tubes 232.

The cable opening 222 in the end cap 106 is adapted to receive an optical cable 236. When the optical cable 236 is inserted into the cable opening 222, it extends through the end cap 106 and is coupled to a cable receptacle 238 mounted within the main body 102. The optical cable 236 is used to transmit laser light from a laser source (not shown) into the main body 102. An optics assembly 250 is mounted within the main body 102 and is used to appropriately collimate and focus the laser light transmitted through the optical cable 236 and receptacle 238, such that the laser light passes through the nozzle aperture 302 and is focused on a point in front of the nozzle aperture 302.

The laser light transmitted through the nozzle aperture 302 is used to conduct various types of welding processes on various types, shapes, and configurations of work pieces. In many instances, the work pieces are formed, either in whole or in part, of various materials that require an inert atmosphere at least near the weld pool during welding operations. Thus, the hand-held laser welding wand 100 additionally includes a gas lens assembly 150, which is mounted on the wand main body 102 and surrounds a portion of the nozzle 104. The gas lens assembly 150 is adapted to receive a flow of inert gas from the non-illustrated gas source and is configured, upon receipt upon receipt of the gas, to develop an inert gas atmosphere around the weld pool.

As was just noted, the optical cable 236 transmits laser light from a laser source for use by the wand 100. In addition, barbed fittings 224, 226, 228 are coupled to the coolant supply passage 214, the coolant return passage 216, and the non-illustrated gas supply passage, respectively, in the end cap 106. These barbed fittings 224, 226, 228 are used to couple the respective openings to hoses or other flexible conduits that are in fluid communication with a coolant source or a gas source, as may be appropriate. It will be appreciated that other types of fittings, such as compression or threaded fittings, may be substituted for one or more of the barbed fittings 224, 226, 228, as needed or desired, based on the particular types of hoses or conduits used. Moreover, the filler media supply tubes 232 are preferably in fluid communication with one or more filler media sources via one or more filler media conduits. The laser source, the coolant source, the filler media sources and, in some instances, the gas source, are configured together into a mobile support system. An embodiment of the mobile support system is depicted schematically in FIG. 4, and will now be described in more detail.

The mobile support system 400 includes a movable cart 402, a laser source 404, a wand coolant source 406, and a filler media supply source 408. The movable cart 402 includes a top surface 412, a bottom surface 414, and a plurality of side walls 416 (only two shown in FIG. 4) that define an enclosed volume 418. Although not shown in FIG. 4, one or more of the side walls 416 is preferably hinged to allow ready access to, and closure of, the enclosed volume 418. In addition, a plurality of wheels 422 are rotationally mounted to the cart bottom surface 414. The wheels 422 allow the cart 402 to be readily moved, by hand or other motive power source, from place to place. A fan 425 is mounted on one of the cart side walls 416 and, when energized, supplies a flow of cooling air into and through the cart inner volume 418.

In the depicted embodiment, various components, devices, and subsystems are mounted on the cart top surface 412, while others are mounted within the cart inner volume 418 or one or on one or more of the cart side walls 416. It will be appreciated that this is merely exemplary of a particular mounting arrangement, and that various other mounting arrangements may be used. It will additionally be appreciated that the components, devices, and subsystems that are mounted on or within the movable cart 402 may vary, but preferably include at least the laser source 404, the wand coolant source 406, and the filler media supply source 408. These and various other components, devices, and subsystems will now be described in more detail.

The laser source 404 is mounted in the cart inner volume 418 and is configured to supply a source of laser light to the hand-held laser welding wand 100. As was noted above, and as is shown in FIG. 4, laser light from the laser source 404 is supplied to the wand 100 via the optical cable 238. The laser source 404 may be implemented using any one of numerous known compact, high efficiency laser sources that supply laser light of sufficient power to perform laser welding operations. For example, the laser source 404 may use a diode-pumped fiber laser source or a direct diode laser source. In one particular embodiment, the laser source 404 is implemented using a YLR-500 diode-pumped multi-mode Ytterbium (Yb) fiber laser source manufactured by IPG Photonics Corporation.

No matter the particular type of laser that is used to implement the laser source 404, it is preferably disposed within a cabinet 424 that includes a control panel 426. The control panel 426 includes various types of user interfaces that allow an operator to control various parameters associated with the laser source 404. A description of the user interfaces included on the control panel 426 is not needed, and will therefore not be provided.

Preferably, the laser source 404 is controllable using one or more external control devices 428. To facilitate this, the laser source 404 also includes at least one external electrical interface 432 that is used to electrically interconnect the laser source 404 and the external control devices 428. It will be appreciated that the electrical interface 432 could be implemented as a serial or parallel digital interface, or an analog interface. However, in the depicted embodiment, the electrical interface 432 is an analog interface. The external control device 428 includes various user interfaces that are used to control and monitor the operation of the laser source 404. The specific user interfaces implemented in the external control devices 428 may vary, but in the depicted embodiment include at least a first manual switch 434 that requires manual manipulation to enable the laser source 404 to emit laser light, and a second manual switch 436 that varies the power output of the laser source 404. The manual switches 434, 436 may be implemented and configured in any one of numerous ways, but in the depicted embodiment the first switch 434 is implemented as a hand-actuated switch, and the second switch 436 is implemented as a foot switch. A description of the remaining user interfaces is not needed, and will therefore not be described.

When the laser source 404 is active it will generate heat. Thus, as FIG. 4 also shows a fluid circuit 438 and a laser heat exchanger unit 442 are also mounted within the cart inner volume 418. The fluid circuit 438 includes one or more conduits 444, such as hoses, that are connected between, and used to direct laser coolant flow through, the laser source 404 and laser heat exchanger unit 442. The laser coolant within the fluid circuit 438, which is preferably water, removes the heat generated by the laser source 404, and flows into and through the laser heat exchanger unit 442, which in turn removes the heat from the coolant. It will be appreciated that the laser source 404 may alternatively be implemented with direct air cooling or an integrated heat exchanger. In such an alternative implementation, the fluid circuit 438 and laser heat exchanger unit 442 are not included.

It will be appreciated that the laser heat exchanger unit 442 may be implemented using any one of numerous heat exchanger configurations. However, in the depicted embodiment the laser heat exchanger unit 442 is a self-contained water-to-air heat exchanger, such as the Lytron Model MCS50 manufactured by Lytron Company, of Woburn, Mass., that includes a coolant reservoir 446, a coolant pump 448, a heat exchanger 452, and a fan 454. The coolant reservoir 446 stores a volume of laser coolant (e.g., water), and the coolant pump 448, when energized, circulates the laser coolant through the fluid circuit 438.

The heat exchanger 452, as is generally known, includes two fluid flow paths, a first fluid flow path 456 and a second fluid flow path 458. The first fluid flow path 456 is fluidly coupled in series in the fluid circuit 438, and the second fluid flow path 458 is fluidly coupled to receive a flow of cooling air that is supplied by the fan 454. Thus, as the coolant flows through the heat exchanger first flow path 456, it is cooled by the cooling air supplied from the fan 454 that flows through the second flow path 458.

In the depicted embodiment, the support system 400 further includes a temperature sensor 462 that senses coolant temperature in the fluid circuit 438. The temperature sensor 462 may be used for any one of numerous purposes and functions, but in the depicted embodiment it is used to supply a signal to an indicator circuit 464 that will activate an audible warning indicator 466 if the coolant temperature reaches or exceeds a predetermined set point. It will be appreciated that the temperature sensor 462, if included, may be disposed to sense coolant temperature at any one of numerous positions in the fluid circuit 438; however, in the depicted embodiment the temperature sensor 462 is disposed to sense the temperature of the coolant exiting the heat exchanger 452.

It will be appreciated that the fluid circuit 438 could additionally supply a flow of coolant to the hand-held laser welding wand 100 to remove heat therefrom. However, the laser source 404 can operate at relatively high temperatures, and as such the coolant within the fluid circuit 438 may not sufficiently cool the wand 100 to a desired temperature. Thus, in the depicted embodiment, a separately controllable wand coolant source 406 is provided, and will now be described in more detail.

The wand coolant source 406 is also mounted in the cart inner volume 418 and is configured to circulate a coolant through the welding wand 100. As was noted above, coolant is supplied to, and flows through, the welding wand 100 to reduce the temperature of the main body 102 to desired value. To do so, the wand coolant source 406 is coupled to the welding wand 100 via a pair of flexible conduits 468, 472, and is preferably a self-contained unit that includes a coolant reservoir 474, a pump 476, and a refrigeration unit 478. The reservoir 474 stores a volume of wand coolant, such as water, and the pump 476, when energized, circulates the wand coolant through the welding wand 100 via the coolant supply conduit 468 and the coolant return conduit 472.

As the wand coolant flows through the welding wand main body 102, it cools the main body 102 to a comfortable temperature. The heat that is transferred from the main body 102 to the wand coolant is then removed by the refrigeration unit 478. The coolant source 406 is preferably controllable, so that an operator can select a desired temperature to which to cool the wand 100. Preferably, the coolant source 406 should allow the temperature to be set and controlled to a temperature that is sufficiently cool to allow an operator to hold the wand 100, yet not so cool that condensation could potentially form on or within the wand 100. An exemplary physical implementation of the coolant source 406 described herein is a VWR Model 1162A manufactured by VWR International, of West Chester, Pa. It will be appreciated, however, that the wand coolant source 406 could be implemented using any one of numerous devices and in any one of numerous configurations.

Turning now to the filler media supply source 408, this subsystem is mounted on the cart top surface 412 and is configured to supply filler media to the hand-held laser welding wand 100. The filler media supply source 408 may supply any one of numerous types of filler media to the welding wand 100. In the depicted embodiment, the filler media supply source 408 is implemented using both a wire feeder 482 and a powder feeder 484. The wire feeder 482 is used to supply wire-type welding filler media to the welding wand 100, and may be implemented using any one of numerous types of wire feeders. In a particular physical implementation, the wire feeder 482 is implemented using a Model WF-3 Wire Feeder, manufactured by CK Worldwide, Inc., of Auburn, Wash. The powder feeder 484 is used to supply powder-type welding filler media to the welding wand 100, and may also be implemented using any one of numerous types of powder feeders. In a particular physical implementation, the powder feeder 484 is implemented using a compact, pressurized, adjustable screw-driven unit, manufactured by Honeywell International, Inc of Morristown, N.J.

In one embodiment, the filler media supply source 408 is controlled, in an on/off fashion, via a foot switch 486. Thus, when an operator using the welding wand 100 desires filler media to be supplied to the wand 100, the user presses the foot switch 486, which in turn causes the filler media supply source 408 to supply the filler media to the welding wand 100. The filler media supply source 408 includes one or more interfaces 488, which are used to interconnect the foot switch 486 and the filler media supply source 408. The rate at which the filler media supply source 408 supplies the filler media to the welding wand 100 is preferably set using a control 492 on the filler media supply source 408. It will nonetheless be appreciated that this function could be implemented in any one of numerous other ways.

No matter the particular type or number of devices that are used to implement the filler media supply source 408, a filler media conduit 494 is coupled between the filler media supply source 408 and the wand 100, to supply the desired filler media thereto. More specifically, as was noted above, the filler media conduit 494 is preferably coupled at one end to the filler media supply source 408, and at another end to one of the filler media supply tubes 232 that is inserted through the end cap 106 and into the main body 102.

In addition to each of the above-described subsystems and components, the mobile support system 400 preferably includes an enclosure 450 and may optionally include an inert gas source 496. The enclosure 450, which is shown more clearly in FIG. 5, includes a plurality of panels 502a-e that are coupled together to define an inner work volume 504 on the cart top surface 412. It will be appreciated that the panels 502a-e may be constructed of any one of numerous materials and in any one of numerous configurations. However, in a particular preferred embodiment, the panels 502a-e are each constructed of substantially transparent plastic that is laminated with a laser-absorbing acrylic material in a surrounding aluminum frame 506.

The acrylic laminated plastic is a preferable since this provides panels 502a-e that are substantially transparent to visible light, yet sufficiently attenuate the laser light emitted from the laser welding wand 100. In the depicted embodiment, the side panels 502a-d and the top panel 502e are each constructed of the acrylic laminated transparent plastic. However, it will be appreciated that not all of these panels need be transparent. Moreover, in the depicted embodiment a separate non-laminated panel is used for the bottom surface (not depicted) of the enclosure 450, though it will be appreciated that a laminated panel could be used.

Figure 4:
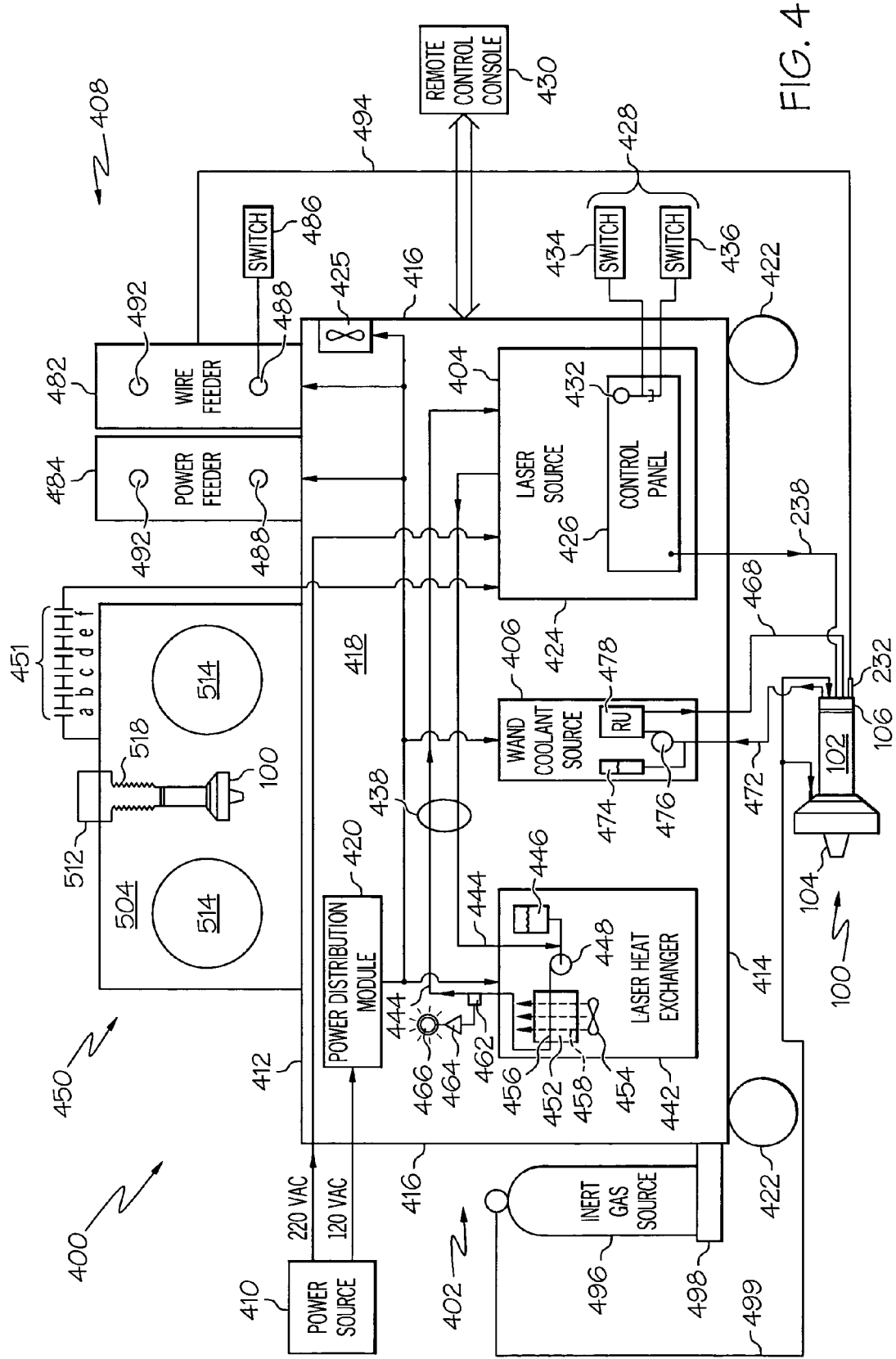
FIG. 4 is a simplified schematic representation of a mobile support system that may be used to provide support to the hand-held laser welding wand of FIGS. 1-3.
Figure 5:
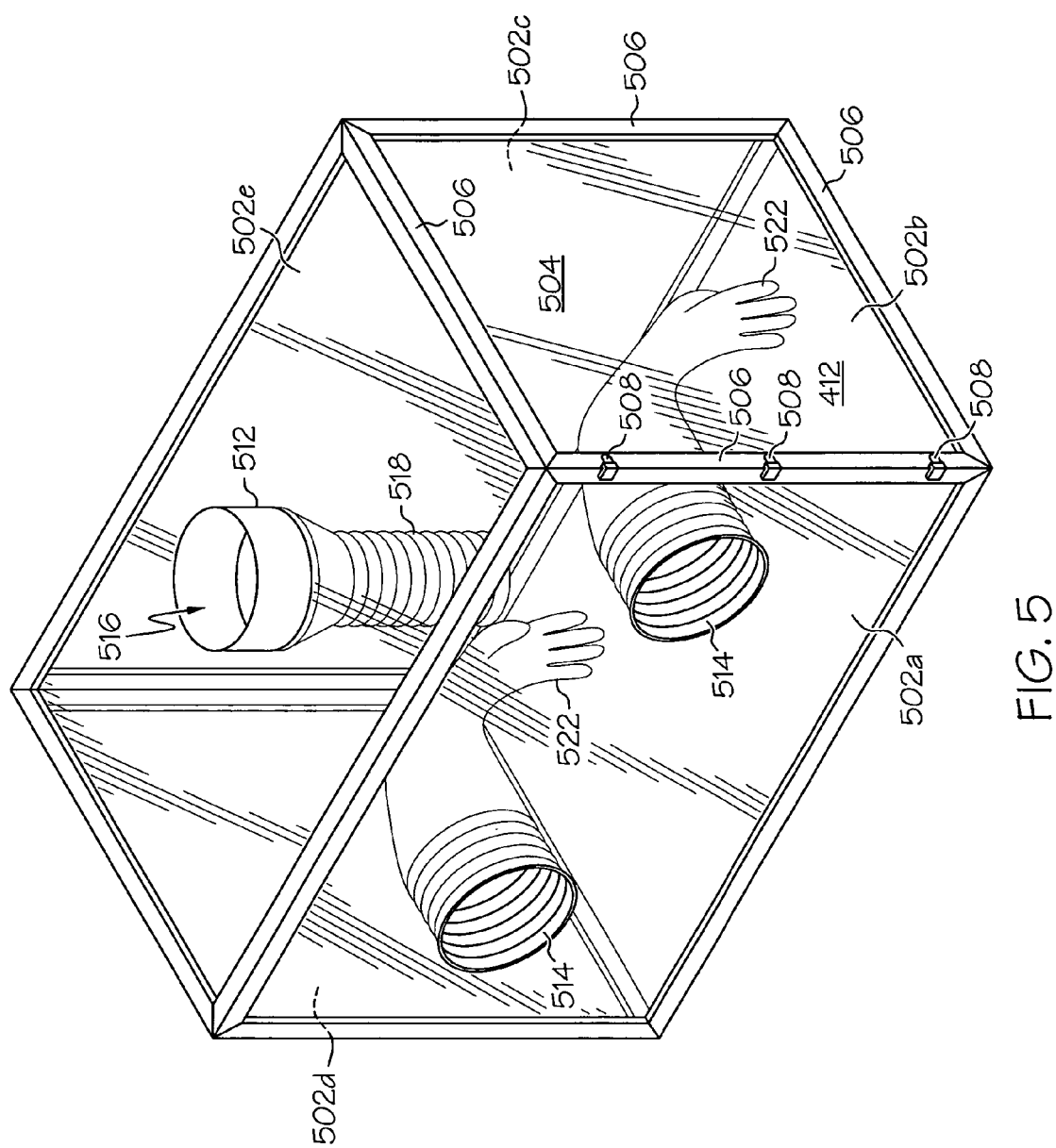
FIG. 5 is a perspective view of an enclosure that may be used with the support system of FIG. 4.

As FIG. 5 also shows, at least some of the panels 502a-e have releasable retainer clips 508 coupled thereto. These clips 508 are used to couple the panels 502a-e together to form the enclosure 450. It will be appreciated that, for clarity and ease of illustration, only three releasable retainer clips 508 are shown. Nonetheless, the releasable retainer clips 508 are preferable since these allow the enclosure 450 to be readily assembled and disassembled and removed from the cart 402 for storage. It will nonetheless be appreciated that the panels 502a-e could be coupled together using any one of numerous devices, and in any one of numerous configurations. Moreover, it is preferable that the enclosure 450, when assembled, is relatively leak tight. Thus, a seal (not shown) is preferably disposed at the interface of each panel 502a-e. In addition, each panel 502a-e preferably includes an interlock contact closure switch 451 (see FIG. 4) that closes when the panel 502a-e is securely in place. The switches are electrically coupled in series with a master laser interlock (not shown), which inhibits laser emission until all of the closure switches 451 are closed.

The inner work volume 504 may be used to conduct various welding operations on small parts or for welding specialized materials using the hand-held laser welding wand 100. Thus, the enclosure 450 further includes a wand interface 512 and at least two glove openings 514. The wand interface 512 includes a sealed opening 516 that extends through the enclosure top panel 502e. A flexible bellows 518 extends downward from the sealed opening 516 toward the cart top surface 412 and provides both a light and a gas tight seal. As FIG. 4 illustrates, the hand-held laser welding wand 100 may be inserted into and partially through the flexible bellows 518 to facilitate laser welding operations within the inner work volume 504. As was described above, and will be further elaborated upon below, inert gas may be supplied to the welding wand 100 to create an inert gas atmosphere at least adjacent the nozzle 104. It will be appreciated that the inert gas that is supplied to the welding wand 100 also desirably creates an inert gas atmosphere within the inner work volume 504.

The two glove openings 514 extend through the enclosure front panel 502. A flexible glove 522 is coupled to, and seals, each of the glove openings 514. The flexible gloves 522, which are preferably formed of rubber or other suitably flexible material, are coupled to the glove openings 514 such that the hand openings for each glove 522 are external to the inner work volume 504. Thus, an operator can insert both hands into the gloves 522 to manipulate both the part being worked on and the laser welding wand 100. It will be appreciated that the size and weight of the enclosure 450 may vary, depending on its configuration and material make-up. However, in a particular physical implementation, the assembled enclosure 450 is 37"×32"×25" and weighs approximately 80 pounds.

It will be appreciated that in some instances it may be necessary or desirable to operate the hand-held laser welding wand 100 outside of the enclosure 450. In such instances, the wand 100 and interconnecting conduits are removed from the enclosure 450 and operated externally thereof. It will be appreciated that in such instances one or more interlock provisions and/or barriers may be needed, as well as additional personal protective equipment for the operator and/or other individuals in the vicinity of the work area.

Returning once again to FIG. 4, it was previously noted that the support system 400 may additionally include the inert gas source 496. In the depicted embodiment, the inert gas source 496 is included, and is mounted on a base 498 that is coupled to the cart 402. It will be appreciated, however, that the inert gas source 496 could be included as a component separate from the cart 402, or an on-site inert gas source (not shown) could be used. Nonetheless, as FIG. 4 shows, and as was described briefly above, in the depicted embodiment the inert gas source 496 supplies inert shield gas to the welding wand 100 via a flexible conduit 499.

The laser source 404, the wand coolant source 406, the filler media supply source 408, and the laser heat exchanger unit 442 all operate on electrical power. In the depicted embodiment, the wand coolant source 406, the filler media supply source 408, the laser heat exchanger unit 442, and the cart fan 425 operate on 120 VAC electrical power, and the laser source 404 operates on 220 VAC electrical power. The electrical power for each of these subsystems may be supplied from on-site power sources, from a portable generator 410, or both. Preferably, the portable generator is configured to supply both 120 VAC and 220 VAC electrical power.

No matter the particular source of electrical power, the cart 402 preferably includes a power distribution module 420 that receives the 120 VAC from the source, and distributes the 120 VAC to the wand coolant source 406, the filler media supply source 408, the laser heat exchanger unit 442, and the cart fan 425 via appropriate wiring. The 220 VAC is supplied directly to the laser source 404 via a separate connector (not shown).

As FIG. 4 also shows, the support system 400 may also be connected to a remote control console 430. The remote control console 430, if included, is configured to implement the functions of the first switch 434, the second switch 436, and the filler media foot switch 486 in a single user interface device. A description of the remote control console 430 is not needed, and will therefore not be provided.

The support system 400 for described herein is transportable to areas remote from a work shop environment, and provides stand-alone support for the hand-held laser welding wand 100. The size and weight of the transportable cart 402 may vary, depending upon the support subsystems that are mounted on it. However, in a particular physical implementation, in which the enclosure 450 is not mounted thereon, and at least the laser source 404, the wand coolant source 406, the filler media supply source 408, the fluid circuit 438, the laser heat exchanger 442, and the power distribution module 420 and associated wiring are mounted thereon, the cart 402 is about 48-inches long, 33-inches deep, and 60-inches high (including the height of the filler media supply source 408), and weighs about 950 pounds.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A mobile laser welding system, comprising:
   a cart having a plurality of wheels rotationally mounted thereon;
   a laser source mounted on the cart and configured to supply laser light;
   a fluid source mounted on the cart and configured to supply cooling fluid;
   a filler medium supply source mounted on the cart and configured to supply a filler medium;
   an accessible enclosure mounted on the movable cart, the enclosure comprising a plurality of panels coupled together to define an inner volume, the accessible enclosure including a plurality of glove openings and a sealed opening;
   a laser welding wand holder extending from the sealed opening into the enclosure inner volume;
   a laser source interlock coupled to the laser source and configured, upon energization, to enable laser light emission therefrom;
   a switch coupled to each of the panels and configured to close upon its associated panel being coupled to another panel, each switch electrically coupled in series with one another between a power source and the laser source interlock;
   a plurality of flexible gloves, each glove coupled to, and configured to seal, one of the glove openings and extend within the enclosure inner volume; and
   a laser welding wand configured to be received in the laser welding wand holder and configured to be grasped by hand, the wand coupled to receive the laser light from the laser source, the cooling fluid from the fluid source, and the filler medium from the filler medium supply source.

2. The system of claim 1, wherein the enclosure further comprises:
   a plurality of panels coupled together to define the inner volume, at least a portion of the panels being substantially transparent to visible light and at least partially opaque to ultraviolet (UV) light and laser light supplied from the laser source.

3. The system of claim 1, further comprising:
   a fluid circuit mounted on the cart, the fluid circuit having a fluid flowing therein that removes heat generated by the laser source; and
   a heat exchanger mounted on the cart and having at least a first fluid flow path and a second fluid flow path, the first fluid flow path fluidly coupled in series in the first fluid circuit, the second fluid flow path fluidly coupled to receive a flow of cooling air, the first heat exchanger adapted to transfer heat between the fluid in the fluid circuit and the cooling air.

4. The system of claim 3, further comprising:
   a fan mounted on the cart and adapted to supply the flow of cooling air to the heat exchanger second fluid flow path.

5. The system of claim 1, further comprising:
   a power distribution module mounted on the cart and electrically coupled to the laser source and the filler medium supply source, the power distribution module adapted to receive AC power from an AC power source and distribute the received AC power to the laser source and the filler medium supply source.

6. The system of claim 1, wherein the filler medium supply source includes:
a powder feeder; and
a wire feeder.

7. The system of claim 1, further comprising:
a flexible optical cable coupled between the laser source and the hand-held laser welding wand;
a flexible fluid conduit coupled between the fluid source and the hand-held laser welding wand; and
a flexible filler medium conduit coupled between the filler medium supply source and the hand-held laser welding wand.

8. The system of claim 1, further comprising:
an inert gas source mounted on, or disposed adjacent to, the movable cart, the inert gas source coupled to the hand-held laser welding wand and configured to supply a flow of inert gas thereto.

9. The system of claim 1, further comprising:
a power supply configured to generate and supply electrical power, the power supply adapted to electrically couple to the laser source, the wand coolant source, and the filler media supply source.

* * * * *

UNITED STATES PATENT AND TRADEMARK OFFICE
CERTIFICATE OF CORRECTION

| | | |
|---|---|---|
| PATENT NO. | : 7,612,312 B2 | Page 1 of 1 |
| APPLICATION NO. | : 11/055924 | |
| DATED | : November 3, 2009 | |
| INVENTOR(S) | : Baker et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 964 days.

Signed and Sealed this

Nineteenth Day of October, 2010

David J. Kappos
*Director of the United States Patent and Trademark Office*